United States Patent [19]

Mori et al.

[11] Patent Number: 4,989,498
[45] Date of Patent: Feb. 5, 1991

[54] HYDRAULIC ACTUATOR

[75] Inventors: Kohei Mori; Noboru Sekiguchi, both of Higashimatsuyama, Japan

[73] Assignee: Jidosha Kiki Co., Ltd., Tokyo, Japan

[21] Appl. No.: 374,971

[22] Filed: Jul. 3, 1989

[30] Foreign Application Priority Data

Jul. 5, 1988 [JP] Japan ................ 63-167085

[51] Int. Cl.⁵ .............................. F16J 15/18
[52] U.S. Cl. ................ 92/168; 92/169.1; 92/171.1; 60/562; 60/588; 277/205; 277/212 C
[58] Field of Search .......... 60/533, 562, 585, 586, 60/588; 92/165 R, 168, 169.1, 171.1; 277/136, 137, 205, 212 C

[56] References Cited

U.S. PATENT DOCUMENTS

| | | | |
|---|---|---|---|
| 3,186,174 | 6/1965 | Hayman | 60/591 |
| 4,474,005 | 10/1984 | Steer | 60/562 |
| 4,527,395 | 7/1985 | Gaiser et al. | 60/562 |
| 4,559,781 | 12/1985 | Steer et al. | 60/562 |
| 4,685,300 | 8/1987 | Steer | 60/562 |

FOREIGN PATENT DOCUMENTS 63-61673 3/1988 Japan.

Primary Examiner—Edward K. Look
Assistant Examiner—F. Daniel Lopez

[57] ABSTRACT

Improvement in an annular seal for use in a hydraulic actuator is obtained in accordance with the present invention, which annular seal is of the type including fitting holes to be inserted by projections formed in a piston guide and is adapted to be mounted between a piston guide sleeve and the piston guide, by the provision of annular projections extending in an annular shape and in the axial direction of the seal in the inner and outer circumferential portions with respect to the location of the fitting holes or in the circumferential area of the piston guide corresponding to that circumferential portions.

5 Claims, 5 Drawing Sheets

HYDRAULIC ACTUATOR

FIELD OF THE INVENTION AND RELATED ART STATEMENT

The present invention relates in general to a hydraulic actuator, and more particularly to a hydraulic actuator sealing structure which employes a piston element incorporated within the hydraulic actuator.

FIG. 8 shows in cross sectional the general construction of a master cylinder 1, which serves as a main organizational element for a hydraulic actuator of the type employing a piston element. This master cylinder 1 is shown comprising a primary piston 3 and a secondary piston 4, which are both inserted slidably into the bore provided extending along the central axis of a master cylinder housing 2 and which are formed with communicating holes 3a and 4a extending radially thereof, respectively, a sleeve 6 mounted fixedly in the housing 2 for guiding the pistons 3 and 4 along the central axis thereof and formed with a central bore serving as a pressure chamber 5a, a pair of piston guides 8a, 8b disposed on the opposite sides of the sleeve 6 and defined with pressurized fluid passages 7a, 7b, and an annular seal 9 defined with a fitting hole 9a (see FIG. 6) therein for receiving a projection 8c formed in the piston guide 8b and disposed between the sleeve 6 and the piston guide 8b. With this construction, the master cylinder 1 operates to cause the hydraulic operating fluid under pressure confined within pressure chambers 5a, 5b to be directed to a hydraulically driven actuator according to the hydraulic actuation of both pistons 3 and 4.

According to the conventional construction of such a master cylinder as reviewed hereinbefore, it is the common practice such that the sleeve 6 is, as noted above, disposed fixedly between the pair of piston guides 8a, 8b, and that the right end surface 6a of the sleeve 6 as viewed in FIG. 5 is placed abutting immediately against the piston guide 8a, and the projection 6c provided in the left end surface 6b of the sleeve 6 as viewed in FIGS. 5 and 7 is forced into the fitting hole 9a in the annular seal 9 so that it may abut closely against the opposed projection 8c of the piston guide 8b in this fitting hole 9a in an attempt to make a proper positioning and prevent possible play of the sleeve 6 during the operation.

However, the conventional annular seal 9 might occasionally lack the proper sealing function at its portion 9b to work, when installed, with the fitting hole 9a. More specifically, when mounting the annular seal 9 in working position, and when the sleeve 6 is rotated in the direction shown by an arrow R as viewed in FIG. 11, the projection 6c of the sleeve 6 may possibly be forced onto the end surface 9c of the fitting hole 9a of the annular seal 9, that portion 9b may be subjected to a twisting effect rendered from such rotating motion of the sleeve 6 so that this questioned position may be deformed to be crumpled, which would very possibly lead to cracking of the material and so to leakage of the hydraulic fluid during the operation. Particularly, when the annular seal 9 has flaws and other possible defects, the sealing performance of the seal 9 would then be spoiled more easily.

It is a primary object of the present invention to provide a hydraulic actuator employing an annular seal which has an excellent sealing performance.

It is another object of the present invention to provide a hydraulic actuator which exhibits an excellent sealing performance yet with an extraordinarily simple construction, thus making its production cost substantially less than that with the conventional construction, accordingly.

In an attempt to attain the objects as noted above, there is provided an improvement in and relating to a hydraulic actuator of the type including piston means installed slidably in a housing along the longitudinal axis thereof, an annular sleeve means mounted fixedly in the bore of the housing and adapted to serve as a pressure chamber, a pair of piston guide means disposed on the opposite ends of the annular sleeve means and defined individually with a passage means for a hydraulic fluid under pressure, and an annular seal means defined with fitting holes to be engaged by a corresponding number of projections formed in the piston guide means and adapted to be located between the annular sleeve means and the piston guide means, wherein the hydraulic fluid under pressure in the pressure chamber may be directed to a hydraulic driven means to follow in accordance with the operation of the piston means, which further comprises, as summarized in brief, a pair of projection means extending in continuous annular shape and projecting in the axial direction of the annular seal means in the inner and outer circumferential areas of the fitting holes defined in the annular seal means or in the circumferential area corresponding to the lateral surface of the piston guide means.

These and other objects and advantages of the invention can be understood better from, the following detailed description to the preferred embodiment of a hydraulic actuator improved in accordance with the present invention as described with reference to the accompanying drawings which are given by way of illustration only, and thus are not limitative of the present invention. In the detailed description of the present invention to follow, reference is made to the accompanying drawings, in which like parts are designated by like reference numerals.

BRIEF DESCRIPTION OF THE DRAWINGS

FIGS. 1 through 4 are intended to show a first embodiment of the present invention; in which FIG. 1 is a general view showing, in cross section, the construction of a hydraulic actuator assembly;

FIG. 2 is a front elevational view showing an annular seal which is mounted in work position between a piston guide and a sleeve of the actuator assembly;

FIG. 3 is a fragmentary cross-sectional view showing in cross section the annular seal taken along the line III—III in FIG. 2;

FIG. 4 is a similar cross-sectional view taken along the line IV—IV in FIG. 2;

Further, FIGS. 6 and 7 are intended to show a second embodiment of the present invention; in which FIG. 6 is a cross-sectional view showing an annular seal and a piston guide, when mounted yet not in a work position;

FIG. 7 is a cross-sectional view showing the manner that the annular seal is installed in work position onto the piston guide;

FIGS. 8 through 11 are drawings for showing a typical conventional hydraulic actuator; in which FIG. 8 is a general cross-sectional view showing the construction of a master cylinder assembly which forms a part of a hydraulic actuator;

FIG. 9 is a front elevational view showing an entire annular seal to be installed between a piston guide and a sleeve of the master cylinder assembly;

FIG. 10 is a fragmentary cross-sectional view showing the manner that the annular seal is mounted in working position; and FIG. 11 is a transversal cross-sectional view showing the annular seal taken along the line XI—XI in FIG. 10.

DETAILED DESCRIPTION OF PREFERRED EMBODIMENTS

In the following, the present invention will now be described in greater detail by way of preferred embodiments shown in the accompanying drawings, particularly in connection with a first preferred embodiment illustrated in FIGS. 1 through 4.

Figure 1:
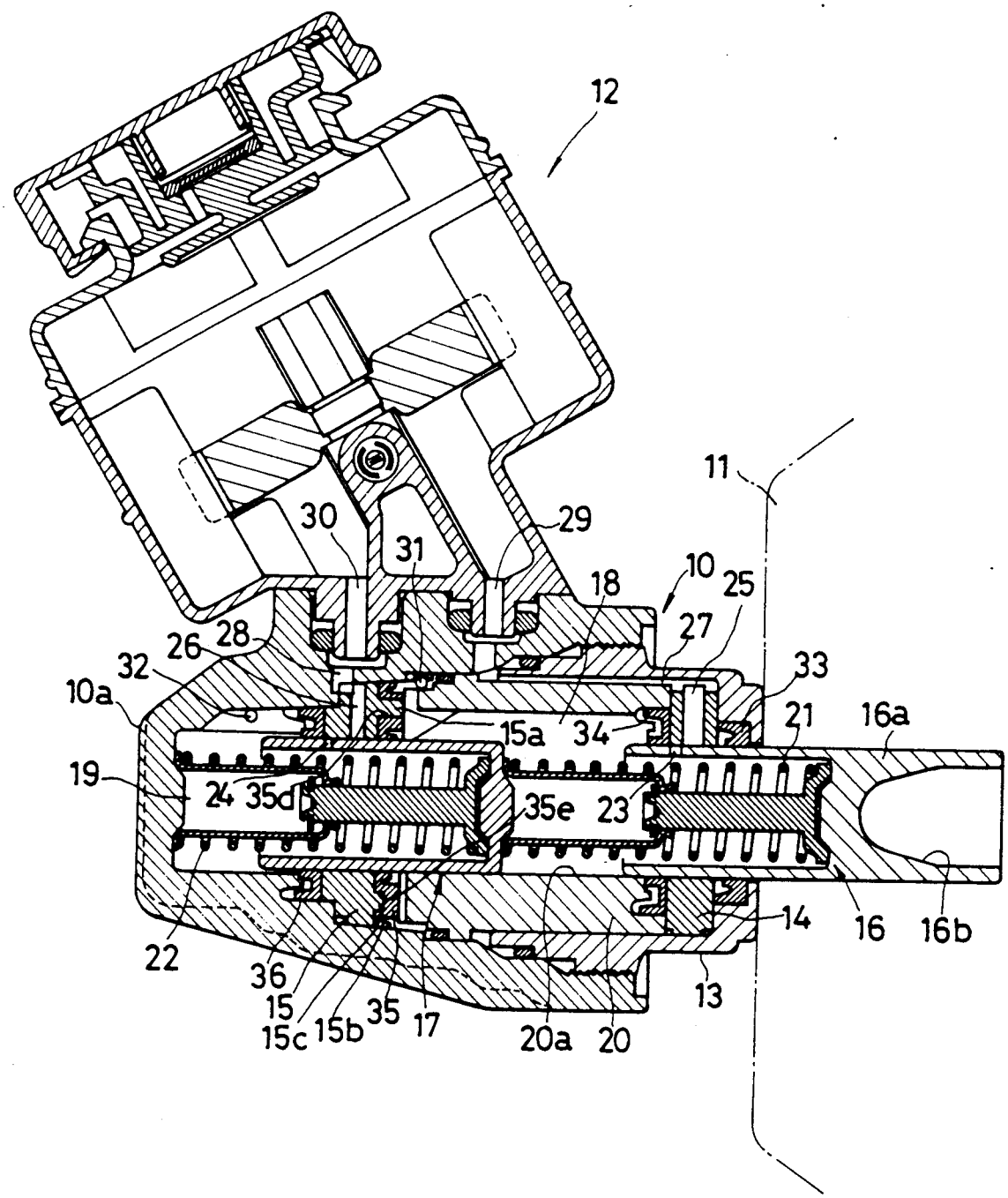

FIG. 1 is intended to show a hydraulic actuator improved by way of a first preferred embodiment of the present invention, wherein this hydraulic actuator is seen comprising a master cylinder 10, a booster 11 operatively connected to the master cylinder 10, and an oil reservoir 12.

It is shown that the master cylinder 10 has a housing 10a with one end being open, which open end is closed by way of a housing cap 13 mounted threadedly into an opening or bore thereof. In the inner circumference of this bore there are inserted ring-shaped or annular piston guides 14 and 15, and further there are mounted a primary piston 16 and a secondary piston 17 into the opening or bore of the annular piston guides 14 and 15, respectively. With this arrangment of such members when assembled together, the inner opening or bore of the housing 10a is divided into two pressure chambers 18 and 19.

On the other hand, these primary and secondary pistons 16 and 17 are also guided in common for sliding motions along the central axis of the housing bore by way of an annular sleeve 20 which is disposed extending longitudinally in the pressure chamber 18, respectively. For maintaining the pressure chamber 18 fluid-tight during the operation, this annular sleeve 20 is shaped in splines in the inner circumference of its central bore, with the ledges 20a of such splines serving to slidably guide these pistons 16, 17 longitudinally along the axis of the sleeve. Also, these primary and secondary pistons 16, 17 are urged resiliently by way of coil springs 21, 22 mounted operatively between these two pistons 16 and 17 disposed oppositely with each other and between the piston 17 and the closed end of the housing 10a, respectively, so that these pistons may be biased to the right as viewed in FIG. 1. These pistons 16, 17 are defined with a recess opened at the leading ends thereof, and also defined respectively with a through holes 23 and 24 extending radially in the circumferential sleeve-like wall thereof. On the other hand, there are also defined through holes 25 and 26 extending radially in the piston guides 14 and 15 in such a manner that one end of these holes 25, 26 may open in the sliding surface of the central bores thereof upon which the pistons 16, 17 are positioned slidably and that the opposite end of such holes may communicate with passages 27 and 28 provided in the housing 10a, respectively.

The oil reservoir 12 is fixedly mounted upon the housing 10a, with passages 29, 30 provided on the bottom of the oil reservoir 12 extending in communication with the passages 27, 28 of the housing 10a, respectively. Also shown in FIG. 1 are openings designated at 31 and 32 which are provided in the cylinder housing 10a, through which the pressure chambers 18 and 19 are put in operative communication with a hydraulically driven element to follow (not shown), for example, wheel brake cylinders of a vehicle. On the other hand, on the end surface of the master cylinder 10 on the side of the housing cap 13 there is a hydraulic booster 11 mounted securely as a unit by way of securing means such as bolts and nuts (not shown). With the arrangement such that booster 11 is mounted directly upon the master cylinder housing, the leading end 16a of the primary piston 16 may extend outwardly from the housing cap 13 into operative position in the hydraulic booster 11, so that the output rod (not shown) of the hydraulic booster 11 may operatively come to engage into the recess 16b in the leading end 16a of the output rod.

Figure 2:
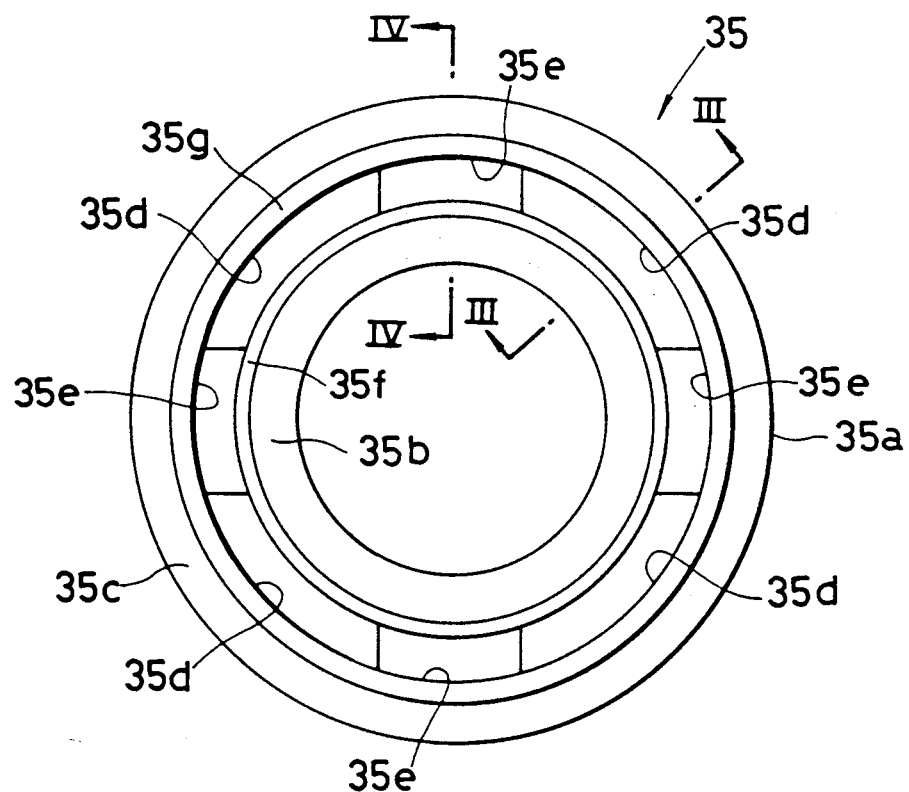
Figure 3:
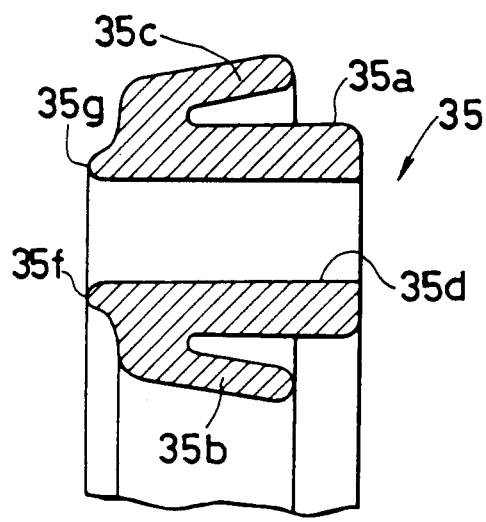
Figure 4:
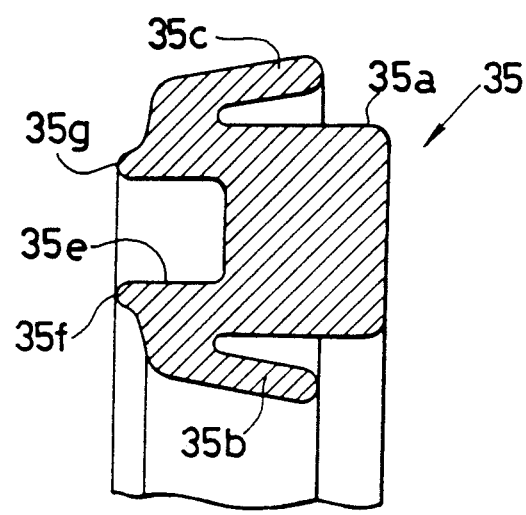

According to the advantageous arrangement of the preferred embodiment of the invention, annular seals 33, 34 and 35, 36 of a resilient material are provided on both sides of the pair of piston guides 14 and 15, respectively, and it is to be noted that one of such annular seals 35 which is disposed between the piston guide 15 and the annular sleeve 20 is designed with a unique configuration in cross section. Referring more specifically, the annular seal 35 comprises, as shown in FIGS. 2 through 4, an annular web 35a, and resilient lip portions 35b and 35c extending generally radially outwardly and inwardly from the outer and inner circumferences of the annular web 35a on the left side thereof as viewed in FIGS. 3 and 4, respectively, and also the annular seal 35 is defined with a plurality of arcuate through openings 35d located at an equal interval around the outer circumference of the annular seal 35 and a corresponding number of arcuate recesses 35e located like a wheel's spokes between the adjacent openings 35d. In addition, on the same side where the resilient lip portions 35b, 35c extend from, there are formed integrally dual annular flanged portions 35f, 35g which comprise a pair of semicircular shaped projections extending laterally or in the axial direction around the circumference of the annular seal 35 on the outer and inner circumferences of the arcuate through openings 35d and the arcuate recesses 35e, respectively.

Now, referring again to FIG. 1, there are shown provided a plurality of projections 15a and 15b formed extending laterally or in the axial direction from the lateral surface of the piston guide 15, the former extending longer to an extent corresponding to the thickness of the annular seal 35 and at an interval corresponding to the location of the arcuate openings 35d, and the latter extending shorter to an extent corresponding to the depth of the arcuate recess 35e and also at a corresponding location to mate therewith. With such a complementary arrangement in the provision of such projections on the part of the piston guide 15 and such arcuate openings and recesses on the part of the annular seal 35, respectively, the projections 15a, 15b may come to engage snugly with the corresponding arcuate through openings 35d and arcuate recesses 35e, respectively, when the annular seal 35 is installed in position with respect to the piston guide 15, so that the leading end of the projections 15a extending through the corresponding arcuate openings 35d to the extent of the thickness of the annular seal 35 may now come into operative contact with the end face of the annular sleeve 20. By virtue of the abutting contact relationship attained between the piston guide 15 and the annular seal 35, advantageous effects of proper positioning of these opposed members and prevention of rattlings from possible play therebetween may be accomplished accordingly.

Next, the operation of the improved hydraulic actuator according to the present invention will be explained.

Firstly, when the through holes 23 and 24 provided on the part of the primary piston 16 and the secondary piston 17 come to a position where they are in operative communication with the corresponding through holes 25, 26 on the part of the piston guides 14 and 15 during the operation, the pressure chambers 18 and 19 are now put into communication with the oil reservoir 12 by way of these through holes 23, 24 and 25, 26 and through the passages 27 and 28, respectively. Consequently, there is no operative effect of fluid pressure rendered to the following driven equipment (not shown) at all.

In such an operating condition, and when the primary piston 16 and the secondary piston 17 are urged to the left as viewed in FIG. 1 under the urging function of the output rod of the hydraulic booster 11, the through holes 23, 24 on the part of the primary piston 16 and the secondary piston 17 are then caused to be shifted to the left, thus ceasing the state of communication existing between the through holes 23, 24 and the through holes 25, 26, respectively. Accordingly, the hydraulic fluid held in the pressure chambers 18 and 19 is then directed to the driven equipment to follow, (not shown), by way of the openings 31, 32 provided in the cylinder housing 10a, respectively.

According to the hydraulic actuator with such an improvement in construction as noted above, there is attainable a substantially efficient sealing property with the employment of the annular seal 35 of a unique and useful construction. More specifically, by virtue of the provision of dual annular flanged portions 35f, 35g which extend circumferentially and project axially of the annular seal 35 in the inner and outer circumferences thereof where there are provided the arcuate through openings 35d and arcuate recesses 35e, when the annular seal 35 is mounted in operative position between the piston guide 15 and the annular sleeve 20, the dual flanged portions 35f and 35g are place under the effect of urging to be deformed resiliently in the axial direction against the piston guide 15, leaving a room of recovery in shape with its resiliency. As a result, even if there occurs a certain amount of deformation while the annular seal 35 is installed, or if the seal has certain flaws and defects in itself, it is possible in practice to attain the proper effect of sealing during the operation of the hydraulic actuator, accordingly.

In addition, according to the preferred embodiment of the invention, wherein the arcuate through openings 35d of the annular seal 35 may be put to be engaged only by the projections 15a of the piston guide 15 extending to the full extent of thickness of the annular seal 35, there is no apprehensions of possibility in the mounting of the annular seal 35 such that the projections 15a may deviate from its proper position in the circumferential directions of the annular sleeve 20 with respect to the corresponding arcuate through openings 35d on the part of the annular seal 35, thus making its mounting job substantially easier and quicker. Furthermore, the annular sleeve 20 is not connected immediately to the arcuate through openings 35d in the annular seal 35 within the hydraulic actuator, and therefore, when screwing the housing cap 13 into the threads in the cylinder housing 10a to fix the annular sleeve 20 in position in the bore thereof, and if the annular sleeve 20 is possibly caused to be rotated followingly with the rotating motion of the housing cap 13, there is no possibility such that the ends of the arcuate through openings 35d may be drawn forcibly and so deformed under the effect of rotating motion by the annular sleeve 20, which would naturally ensure the improvement in the sealing performances of the annular seal 35, accordingly.

Figure 5:
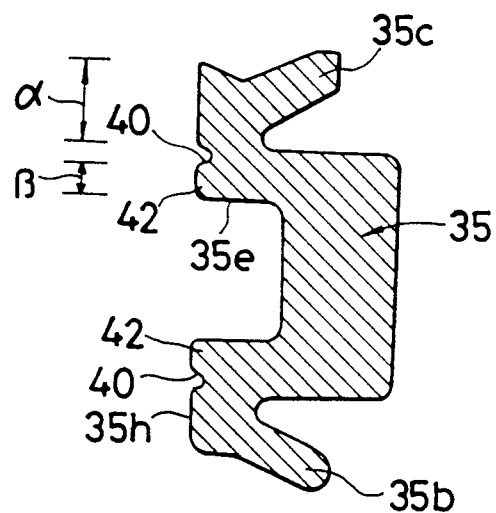
FIG. 5 is a cross-sectional view showing a modification of the annular seal.

FIG. 5 shows, in a cross section, a modified annular seal 35 by way of another preferred embodiment of the present invention, wherein a flat end surface 35h on the left side as viewed in this figure, is provided which is placed adjacent the lateral surface 15c of the piston guide 15, when assembled together. In addition, there are defined annular grooves 40 in the flat end surface 35h, which annular grooves extend in dual full circles in the circumference of the annular seal 35 in the outer and inner circumferential areas of the location where the arcuate through openings 35d and the arcuate recesses 35e are positioned. With the provision of these annular grooves, an annular projection 42 may be attained, which extends substantially outwardly or in the axially left direction of the annular seal 35 as viewed in the drawing figure in the inner and outer circumferential areas with respect to the arcuate through openings 35d and the arcuate recesses 35e. With this arrangement, the annular projection 42 and the flat end surface 35h are placed in a coplanar relationship with each other having the same extension in the axial direction of the annular seal 35, accordingly.

Now, according to the annular seal 35 modified by way of this preferred embodiment, by virtue of an advantageous arrangement such that the area of the outer circumferential lateral face $\alpha$ is made greater than that of the inner circumferential lateral face $\beta$, the stresses may concentrate upon the annular projection 42 when installed in work position, thus serving a better sealing function. On the other hand, with the provision of the outer circumferential lateral face $\alpha$ with a relatively greater area, there is attained such an advantageous effect of preventing deformation of the annular seal 35 from occurring, accordingly.

Figure 6:
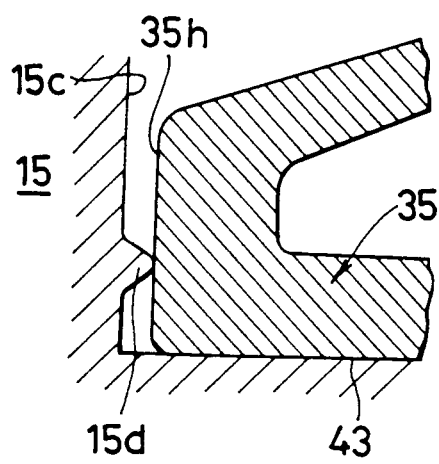
Figure 7:
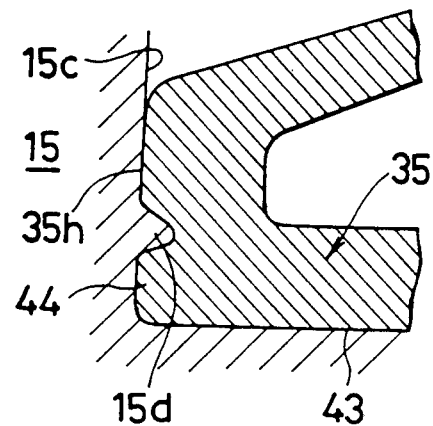
Figure 8:
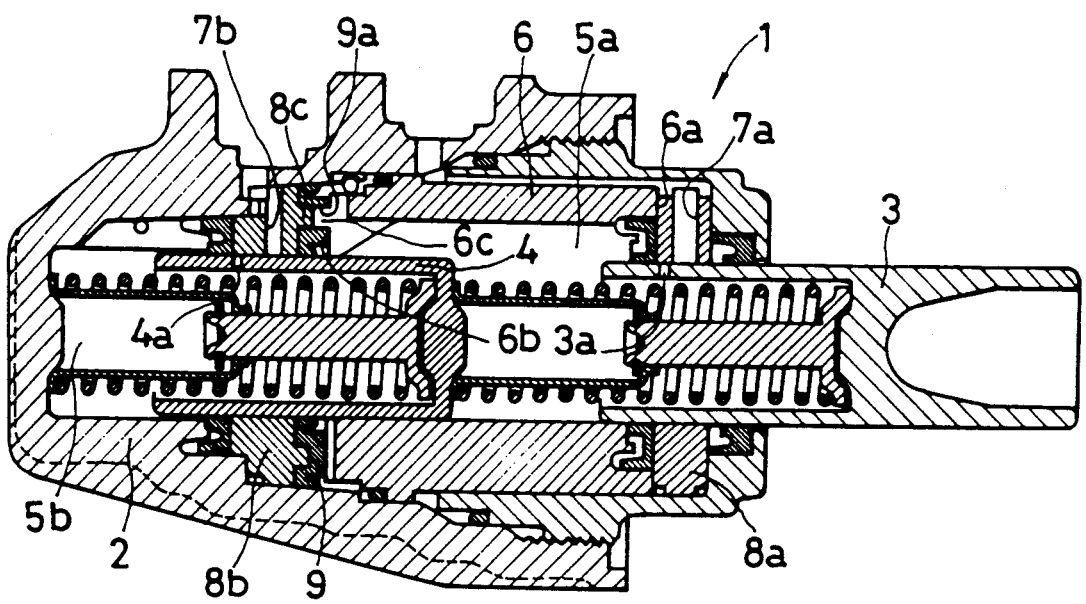
Figure 9:
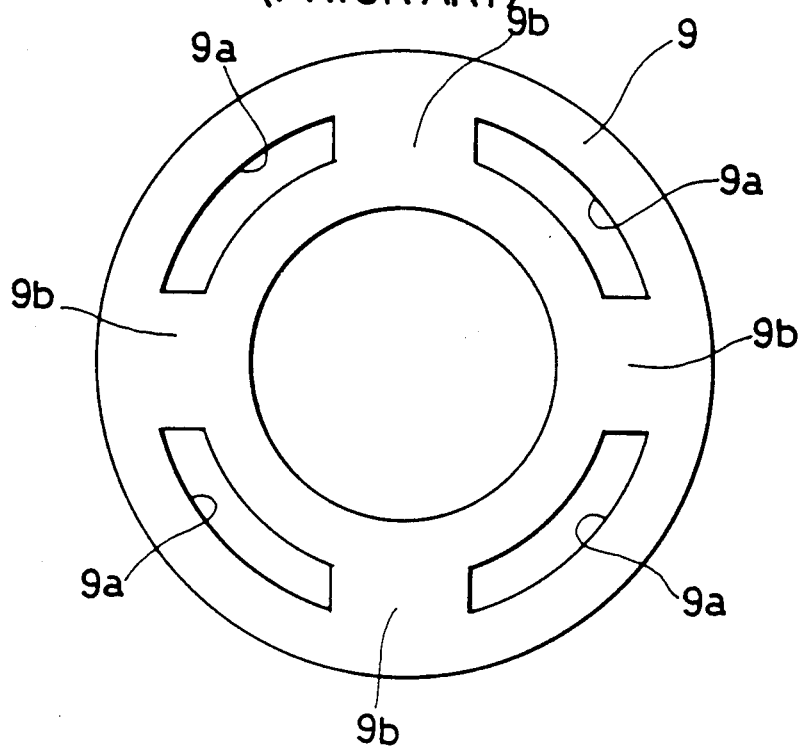
Figure 10:
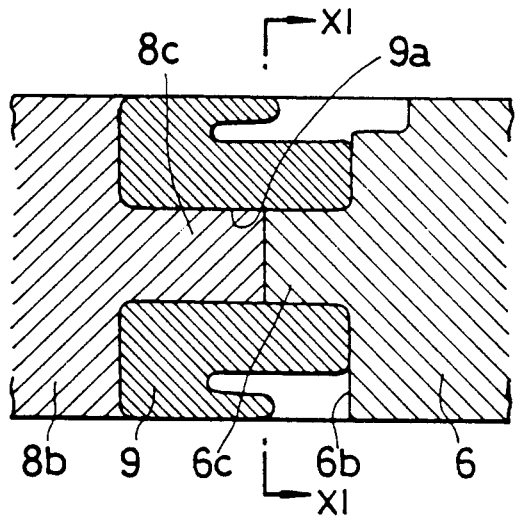
Figure 11:
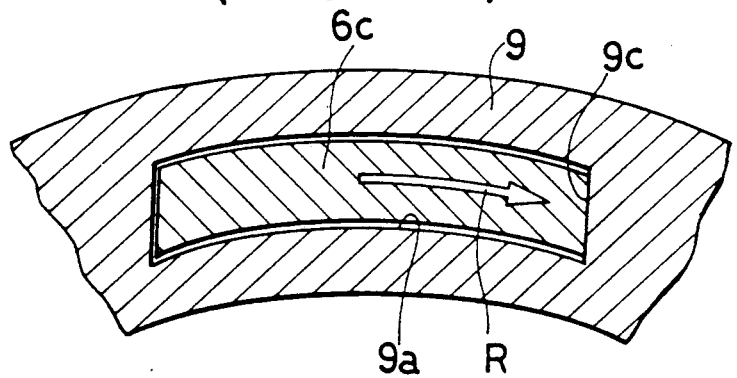

FIGS. 6 and 7 are presented to show another aspect of the present invention by way of a third preferred embodiment thereof, wherein there is provided a projection 15d extending outwardly or in the axially right direction from the lateral surface 15c of the piston guide 15 as viewed in the drawing figures, more specifically in location near the area where there are the plurality of projections 15a and 15b formed extending laterally or in the axial direction from the lateral surface 15c of the piston guide 15, that is the location which corresponds to the inner and outer circumferences of a fitting hole 43 of the annular seal 35.

According to the arrangement specific to this third preferred embodiment of the invention shown in FIGS. 6 and 7, it is advantageous that the projection 15d of the piston guide 15 may intrude partly into the flat end surface 35h of the annular seal 35, when assembled together. As a consequence, there is formed a projected portion 44 which may serve a substantially same function as in the foregoing embodiment stated hereinbefore in the circumferential area of the fitting hole 43 of the annular seal 35, thus making it feasible in practice to attain the substantial improvement in the sealing function as well as the prevention of undesired deformation of the annular seal 35, accordingly.

While the invention has been described in detail with reference to certain preferred embodiments thereof, it is to be understood that the present invention is not restricted to such embodiments, but rather that variations and modifications may be made on the basis of the teachings of the invention without departure from the scope and spirit of the present invention.

For instance, it will be appreciated that the cross-sectional shape of the dual flanged portions 35f and 35g as defined in the annular seal 35 may naturally be triangular or in any other suitable shape, instead of being semi-circular in shape. Also, it is to be noted that it is not necessarily essential to have the dual flanged portions 35f and 35g extending in an annular shape, but it may instead be of a square or elliptical shape in cross-section according to the configuration of the annular sleeve 20, as the case may be.

As reviewed fully hereinbefore with respect to the improvement in construction by way of the present invention such that there are provided dual annular flanged portions projecting in a concentric relationship and in the axial direction in the inner and outer circumferences where the plurality of fitting holes are located in the annular seal or in the area which corresponds in location to the lateral surface of the piston guide with which the annular seal comes to contact, when assembled, it is feasible in practice to attain a substantial improvement in the sealing function of the annular seal, when installed in position between the piston guide and the annular sleeve without any difficulties as encountered in the installation job with the seals of the conventional construction. In addition to such advantageous attainment in the effect and function, such an advantage may further be attained that it may be produced with a substantial reduction in production cost in view of the substantially simple construction with the mere provision of annular projections or flanged portions to the conventional construction of an annular seal or a piston guide, accordingly.

It is to be understood that the appended claims are essentially intended to cover all of such generic and specific features as are particular to the invention as disclosed herein and all statements relating to the scope of the invention, which as a matter of language might be said to fall thereunder.

We claim:

1. A hydraulic actuator of the type including piston means installed slidably in a housing along the longitudinal axis thereof, annular sleeve means mounted fixedly in a bore of said housing and adapted to serve as a pressure chamber, a pair of piston guide means disposed on the opposite ends of said annular sleeve means and defined individually with passage means for a hydraulic fluid under pressure, and annular seal means defined with fitting holes to be engaged by a corresponding number of projections formed in said piston guide means and adapted to be located between said annular sleeve means and said piston guide means, wherein said hydraulic fluid under pressure in said pressure chamber may be directed to a hydraulic driven means to follow in accordance with the operation of said piston means, which further comprises a pair of projection means extending in continuous annular shape and projecting in the axial direction of said annular seal means in the inner and outer circumferential areas of said fitting holes defined in said annular seal means or in the circumferential area corresponding to the lateral surface of said piston guide means.

2. The hydraulic actuator as claimed in claim 1 wherein said pair of projection means extending from said annular seal means comprise physical projections extending from the end surface of said annular seal means where said piston guide means come to operatively contact.

3. The hydraulic actuator as claimed in claim 1 wherein the end surface of said annular seal means where said piston guide means come into contact is flat, and wherein groove means extending in an annular shape are defined in said flat end surface, whereby projection means are attained extending substantially from said flat end surface in the inner and outer circumferential areas of said flat end surface in the axial direction of said annular seal means.

4. The hydraulic actuator as claimed in claim 3 wherein the area of said outer circumferential area is made greater than that of said inner circumferential area with respect to said annular groove means in the end surface of said annular seal means.

5. The hydraulic actuator as claimed in claim 1 wherein said projection means formed extending from the end surface of said piston guide means is caused to intrude into said flat end surface of said annular seal means, when assembled in position, whereby projection means extending substantially from said end surface of said annular seal means.

* * * * *